US012092045B2

(12) United States Patent
Tohta et al.

(10) Patent No.: US 12,092,045 B2
(45) Date of Patent: Sep. 17, 2024

(54) CONTROL METHOD AND CONTROL DEVICE FOR INTERNAL COMBUSTION ENGINE

(71) Applicant: NISSAN MOTOR CO., LTD., Yokohama (JP)

(72) Inventors: Yuzuru Tohta, Kanagawa (JP); Kohei Kamiya, Kanagawa (JP); Noriaki Ejiri, Kanagawa (JP); Tomoaki Kobayashi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/632,037

(22) PCT Filed: Apr. 8, 2020

(86) PCT No.: PCT/JP2020/015821
§ 371 (c)(1),
(2) Date: Feb. 1, 2022

(87) PCT Pub. No.: WO2021/205566
PCT Pub. Date: Oct. 14, 2021

(65) Prior Publication Data
US 2023/0032697 A1 Feb. 2, 2023

(51) Int. Cl.
*F02D 41/00* (2006.01)
*F02D 41/02* (2006.01)
(Continued)

(52) U.S. Cl.
CPC ..... *F02D 41/0085* (2013.01); *F02D 41/0225* (2013.01); *F02D 41/029* (2013.01);
(Continued)

(58) Field of Classification Search
CPC ....... F02D 2200/1002; F02D 2200/101; F02D 2200/602; F02D 2250/28; F02D 41/0085;
(Continued)

(56) References Cited

U.S. PATENT DOCUMENTS 6,247,449 B1 * 6/2001 Persson .................. F02D 17/02 123/436
10,753,304 B2 * 8/2020 Kuroda .................. F01N 3/101
(Continued)

FOREIGN PATENT DOCUMENTS

JP 08-177566 A 7/1996
WO WO 2018 051513 * 3/2018 ............. F02D 29/02

*Primary Examiner* — Carl C Staubach
(74) *Attorney, Agent, or Firm* — Foley & Lardner LLP

(57) ABSTRACT

A control method for an internal combustion engine configured to implement fuel cut in response to becoming zero of an accelerator opening degree during travel of a vehicle, and generate an antiphase torque after the fuel cut by supplying fuel to a cylinder, in order to cancel out vibration of the vehicle caused due to the fuel cut includes setting a timing of generating the antiphase torque to be later than that for normal operation, in response to implementation of the fuel cut under high torque idle operation in which a torque of the internal combustion engine immediately before the fuel cut where the accelerator opening degree is zero is higher than that in the normal operation.

8 Claims, 3 Drawing Sheets

(51) Int. Cl.
*F02D 41/16* (2006.01)
*F02D 41/40* (2006.01)

(52) U.S. Cl.
CPC ........... *F02D 41/16* (2013.01); *F02D 41/401* (2013.01); *F02D 2200/1002* (2013.01); *F02D 2200/101* (2013.01); *F02D 2200/602* (2013.01); *F02D 2250/28* (2013.01)

(58) Field of Classification Search
CPC .... F02D 41/0225; F02D 41/029; F02D 41/12; F02D 41/16; F02D 41/34; F02D 41/401
See application file for complete search history.

(56) References Cited

U.S. PATENT DOCUMENTS

| | | | | |
|---|---|---|---|---|
| 2004/0267436 | A1* | 12/2004 | Prodi | F02D 37/02 701/110 |
| 2008/0070746 | A1* | 3/2008 | Shiomi | F16H 61/66259 477/43 |
| 2009/0164108 | A1* | 6/2009 | Baird | F01N 3/0231 701/115 |
| 2015/0252742 | A1* | 9/2015 | Stroh | F02D 41/0002 123/192.1 |
| 2019/0256100 | A1* | 8/2019 | Okishima | B60W 30/02 |
| 2020/0164852 | A1* | 5/2020 | Ohn | B60W 20/17 |
| 2020/0173378 | A1* | 6/2020 | Koyasu | F02D 13/0261 |
| 2021/0199059 | A1* | 7/2021 | Yamane | B60W 30/20 |
| 2022/0120252 | A1* | 4/2022 | Sugimoto | F02D 41/0255 |

* cited by examiner

CONTROL METHOD AND CONTROL DEVICE FOR INTERNAL COMBUSTION ENGINE

TECHNICAL FIELD

The present invention relates to a control method and a control device for an internal combustion engine, which implements fuel cut in response to becoming zero of an accelerator opening degree during travel of a vehicle and thereafter generates an antiphase torque by supplying fuel to a cylinder in order to cancel out vibration of the vehicle caused due to the fuel cut.

BACKGROUND ART

Fuel cut, i.e. suspension of fuel supply, is known to be implemented in accordance with a predetermined condition for permitting the fuel cut, in response to becoming zero of an accelerator opening degree during travel, for a purpose of reducing fuel consumption in an internal combustion engine for a vehicle.

Such implementation of the fuel cut sharply reduces a torque generated by the internal combustion engine, and thereby causes torsional vibration in a drive system. The torsional vibration results in frontward and rearward vibration of the vehicle. Patent Document 1 discloses an art for canceling out such vehicle vibration due to fuel cut by generating an antiphase torque by supplying fuel to some cylinders after the fuel cut.

However, the art of Patent Document 1 fails to take into account a magnitude of a level difference in torque of the internal combustion engine between before and after implementing the fuel cut.

For example, in case that for some reason the internal combustion engine generates an extra torque in addition to a torque required for travel of the vehicle, the internal combustion engine is at a relatively high level in torque generation even if the accelerator opening degree is set to zero by a driver, where the fuel cut is implemented under such state of the relatively high torque generation. In this case, a lag from a timing at which the accelerator opening degree becomes zero before the fuel cut until a timing at which a torque of a drive shaft in a drive system of the vehicle turns from positive to negative via zero is greater than a case that the internal combustion engine immediately before the fuel cut is at a low level in torque generation. The time lag in change of torque of the drive shaft is mainly ascribable to backlash in respective parts of the drive system.

The vehicle vibration due to the fuel cut occurs after the torque of the drive shaft turns from positive to negative. Accordingly, the conventional art without consideration to the magnitude of torque generated by the internal combustion engine upon the fuel cut does not necessarily generate the antiphase torque at an appropriate timing. The antiphase torque generated at an inappropriate timing may rather aggravate the vehicle vibration.

PRIOR ART DOCUMENT(S)

Patent Document(s)

Patent Document 1: JP H08-177566 A

SUMMARY OF THE INVENTION

According to one aspect of the present invention, a control method includes setting a timing of generating the antiphase torque to be later than that for normal operation, in response to implementation of fuel cut under high torque idle operation in which a torque of an internal combustion engine immediately before the fuel cut where accelerator opening degree is zero is higher than that in the normal operation.

In case that the torque of the internal combustion engine immediately before the fuel cut is higher than that for the normal operation, such situation increases a time lag after the accelerator opening degree becomes zero until a torque of a drive shaft turns from positive to negative, and delays a timing at which vehicle vibration due to the fuel cut occurs. Accordingly, the vehicle vibration can be appropriately suppressed by setting the timing of generating the antiphase torque than that for the normal operation.

MODE(S) FOR CARRYING OUT THE INVENTION

The following describes an embodiment of the present invention with reference to the drawings.

Figure 1:
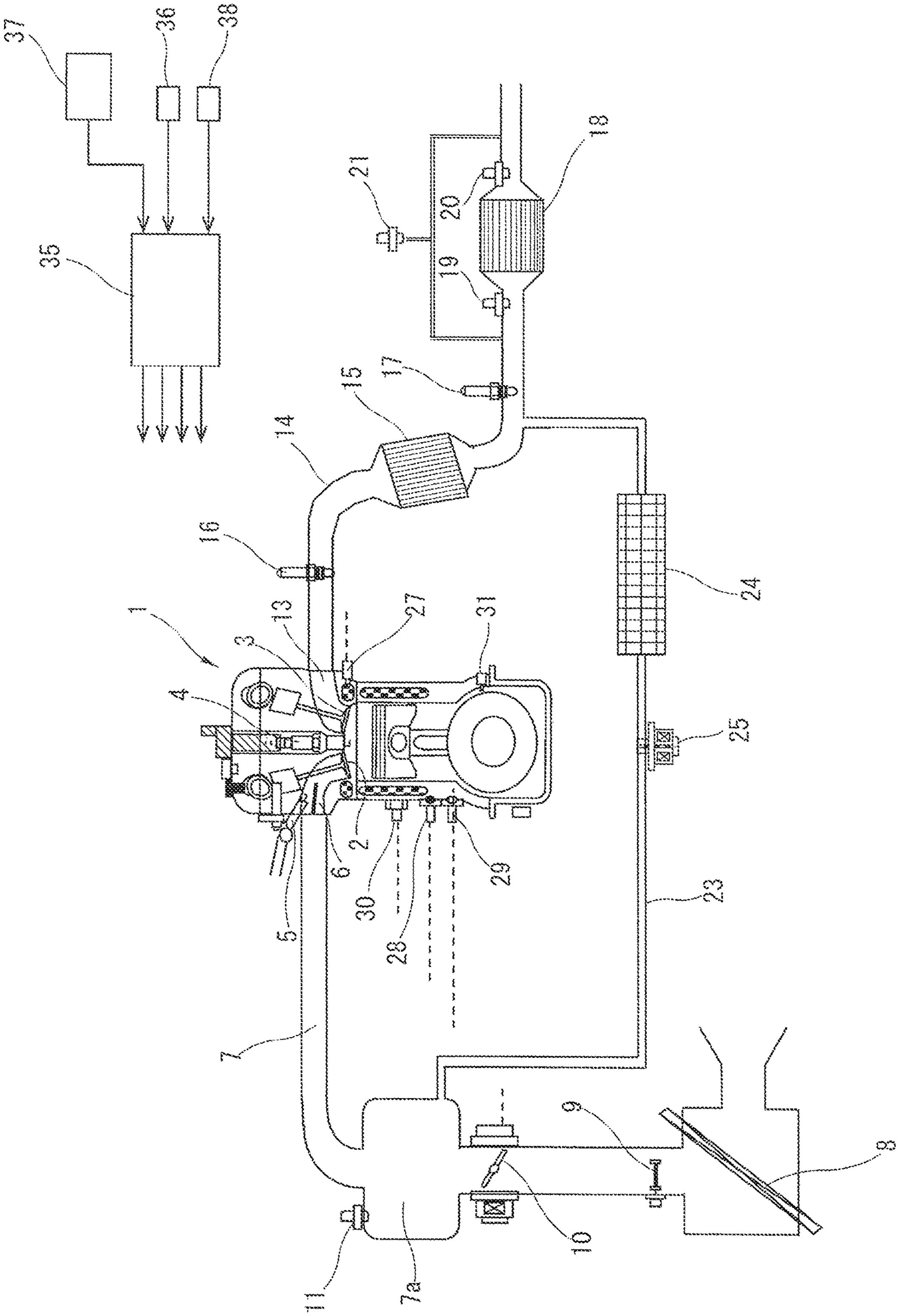
FIG. 1 is an illustrative view showing system configurations of an internal combustion engine according to an embodiment.

FIG. 1 schematically illustrates system configurations of an internal combustion engine 1 according to the embodiment. Internal combustion engine 1 is, for example, a spark ignition type straight-three internal combustion engine, and includes a spark plug 4 at a center of a combustion chamber surrounded by an intake valve 2 and an exhaust valve 3, wherein intake valve 2 is accompanied by a variable valve timing mechanism not shown. Internal combustion engine 1 further includes an intake port 6 in which a fuel injection valve 5 structured to inject fuel toward intake valve 2 is disposed. Incidentally, internal combustion engine 1 may be a cylinder direct injection type internal combustion engine structured to inject fuel directly into cylinders.

Intake port 6 is connected to an intake passage 7 including an intake collector 7*a*. Upstream with respect to intake collector 7*a*, intake passage 7 further includes an air cleaner 8, an air flow meter 9, and an electronically-controlled throttle valve 10 which are arranged in this order from the upstream side. Intake collector 7*a* includes a T-MAP sensor 11 structured to measure a pressure and an intake air temperature inside the intake collector 7*a*.

Exhaust port 13 is connected to an exhaust passage 14 including a catalyst unit 15 composed of a three-way catalyst. Exhaust passage 14 further includes: an air-fuel ratio sensor 16 disposed upstream with respect to catalyst unit 15; an O2 sensor 17 disposed downstream with respect to catalyst unit 15; and an exhaust particulate filter 18 (i.e., a GPF 18) disposed downstream with respect to O2 sensor 17 and structured to collect exhaust particulates in exhaust gas. GPF 18 is composed of a sealed type ceramic monolithic filter coated with a three-way catalyst. As an example, catalyst unit 15 of the upstream side is disposed inside an engine room of a vehicle, while GPF 18 is disposed beneath a floor of the vehicle.

GPF 18 is provided with temperature sensors 19 and 20 respectively disposed at an inlet and an outlet of GPF 18. Furthermore, GPF 18 is provided with a differential pressure sensor 21 structured to respond to a difference in pressure between the inlet and the outlet of GPF 18, in order to measure a pressure loss (i.e., monitor a state of particulate accumulation).

Intake passage 7 and exhaust passage 14 are connected to each other via an exhaust gas recirculation passage 23. Exhaust gas recirculation passage 23 includes an EGR gas cooler 24 and an EGR valve 25.

Internal combustion engine 1 includes various sensors such as a cooling water temperature sensor 27, an oil temperature sensor 28 and an oil pressure sensor 29 for lubrication oil, a knocking sensor 30, and a crank angle sensor 31 for measurement of an engine speed.

The various sensors above send measurement signals to an engine controller 35. In addition to this, engine controller 35 receives various signals such as: a measurement signal from an accelerator opening sensor 36 that measures a depression amount of an accelerator pedal operated by a driver; a signal corresponding to a gear ratio of a transmission which is outputted from a transmission controller 37; and a vehicle speed signal from a vehicle speed sensor 38. Furthermore, engine controller 35 receives signals corresponding to an electric current in an alternator and a coolant pressure in an air conditioner, in order to calculate engine loads required for driving the alternator not shown and a compressor for the air conditioner not shown which are auxiliaries driven by internal combustion engine 1.

Based on these signals, engine controller 35 performs overall control on internal combustion engine 1. For example, engine controller 35 optimally controls a fuel injection amount and a fuel injection timing of fuel injection valve 5 in each cylinder, an ignition timing of spark plug 4, and an accelerator opening degree of throttle valve 10.

Engine controller 35 is configured to implement forcible regeneration of GPF 18 in response to detection of a particulate accumulation state above a predetermined level (i.e., detection of a so-called clogged state) by differential pressure sensor 21, while also considering other conditions including a temperature of GPF 18. Specifically, the exhaust particulates that have accumulated are burned and removed by: increasing the accelerator opening degree of throttle valve 10 and thereby increasing amounts of intake air and fuel; and delaying the ignition timing and thereby heightening an exhaust gas temperature. The forcible regeneration of GPF 18 is implemented in case that GPF 18 is low in temperature due to continuous low load operation etc., because in general GPF 18 is spontaneously regenerated in case that GPF 18 is high in temperature due to high load operation etc. For example, the forcible regeneration of GPF 18 is implemented when the accelerator opening degree is zero, i.e., when the accelerator pedal is released by a driver.

Internal combustion engine 1 is installed in the vehicle, in combination with the transmission not shown. The transmission may be any one of a stepped or continuously variable automatic transmission or a manual transmission. As an example, the transmission is a belt type continuously variable transmission (CVT) that has a transmission ratio continuously controlled by transmission controller 37 with reference to the accelerator opening degree and the vehicle speed mainly. The transmission includes an input shaft connected to an output shaft (i.e., a crank shaft) of internal combustion engine 1 via a torque converter not shown, and includes an output shaft structured to drive driving wheels of the vehicle via a final reduction gear and a drive shaft.

Next, the following describes fuel cut control upon deceleration, which is a focused part of the present disclosure. Internal combustion engine 1 according to the present embodiment implements fuel cut during coasting travel performed due to release of the accelerator pedal by a driver during vehicle travel, for purposes such as improvement of fuel efficiency and achievement of so-called engine brake effect. After implementing the fuel cut, internal combustion engine 1 implements a process for generating an antiphase torque by injecting fuel in a cylinder (i.e., by utilizing combustion in the cylinder), in order to cancel out frontward and rearward vibration of the vehicle due to torsional vibration caused by the fuel cut. For example, the frontward and rearward vibration of the vehicle due to the torsional vibration can be effectively suppressed by applying the antiphase torque at a phase delayed for a quarter cycle of the torsional vibration from the torsional vibration. This timing of applying the antiphase torque is set depending on a torque of internal combustion engine 1 immediately before the fuel cut, and is further delayed in case that the torque of internal combustion engine 1 immediately before the fuel cut is high.

The antiphase torque is generated with use of a combustion cylinder that is determined to be a cylinder nearest to a desired timing in original ignition timing according to ignition order. Then, cylinders prior to the combustion cylinder in the ignition order is determined to be non-combustion cylinders. The antiphase torque is generated at a magnitude that increases with increase in torque of internal combustion engine 1 immediately before the fuel cut. In other words, the increase in torque of internal combustion engine 1 immediately before the fuel cut increases an amount of fuel injection to the combustion cylinder for generating the antiphase torque. Furthermore, if the antiphase torque generated by one combustion cylinder is insufficient, internal combustion engine 1 implements fuel injection and ignition also in a second combustion cylinder that is a cylinder subsequent to a first combustion cylinder in the ignition order.

As detailed below, in case that the torque of internal combustion engine 1 immediately before the fuel cut is high, such situation delays a timing at which an actual torque of the drive shaft contributory to the torsional vibration turns from positive to negative, and thereby delays a timing at which the frontward and rearward vibration of the vehicle due to the torsional vibration occurs. This delays the timing delayed for the quarter cycle of the torsional vibration, i.e., a timing at which the antiphase torque is desired to be generated.

The torsional vibration has a frequency affected by the gear ratio of the transmission and by the engine speed of internal combustion engine 1. The lower the gear ratio of the transmission is (i.e., the lower speed gear the transmission is at), the lower the frequency of the torsional vibration is, and the more the timing late by the quarter cycle of the torsional vibration is delayed. Furthermore, the higher the engine speed of internal combustion engine 1 is, the higher the frequency of the torsional vibration is, and the more the timing late by the quarter cycle of the torsional vibration is advanced.

Thus, internal combustion engine 1 according to the present embodiment selects the combustion cylinder(s), which is/are employed for generating the antiphase torque after the fuel cut, and the non-combustion cylinders, in view of the torque of internal combustion engine 1 immediately before the fuel cut, the gear ratio upon implementing the fuel cut, and the engine speed of internal combustion engine 1 upon implementing the fuel cut.

Figure 2:
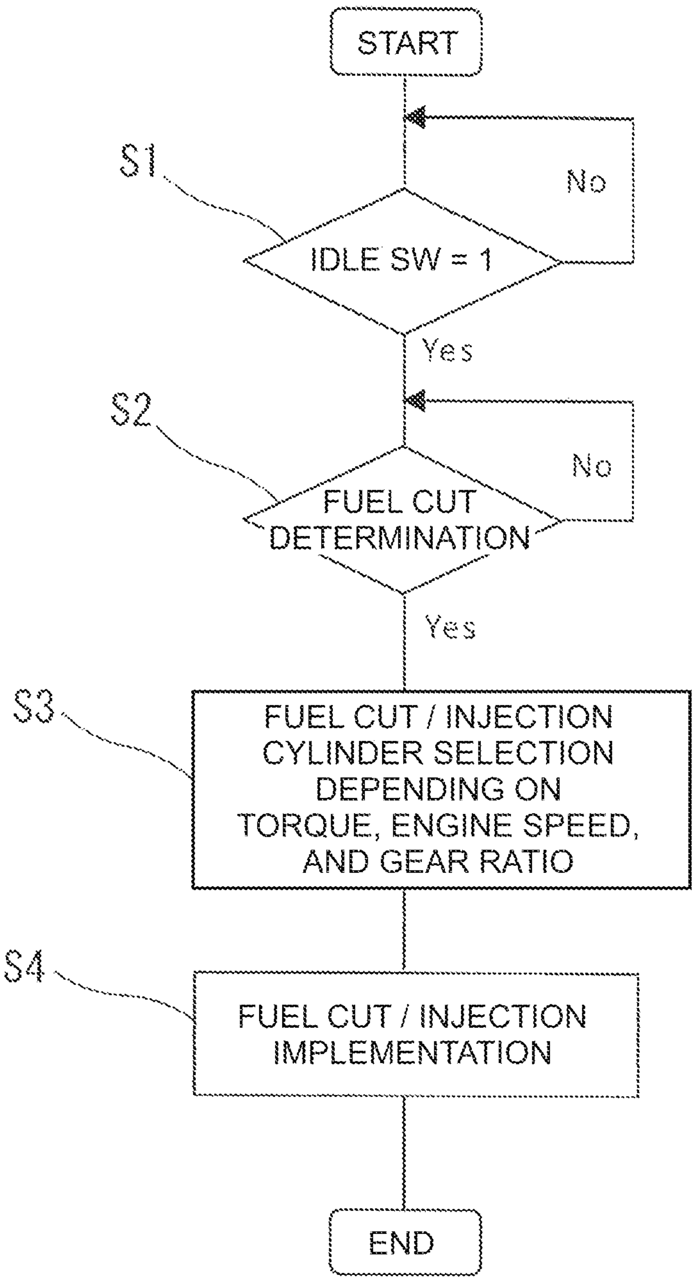
FIG. 2 is a flow chart showing processes of fuel cut control according to the embodiment.

FIG. 2 is a flow chart of processes for the fuel cut control executed by engine controller 35. Step 1 is repetitive determination of whether an idle switch flag is ON. The idle switch flag is a flag for representing being zero of the accelerator opening degree, and is turned ON (i.e., has a value of "1") in response to determination that the accelerator pedal is fully closed, wherein the determination is made in response to satisfaction of a condition that the output signal from accelerator opening sensor 36 corresponding to the depression of the accelerator pedal continues to be lower than a predetermined level for a predetermined time period that is relatively short.

If the idle switch flag is ON, i.e., if the accelerator opening degree is zero, step 2 is executed to determine whether to permit the fuel cut. Specifically, this is determination of whether some conditions for permitting the fuel cut other than the accelerator opening degree are satisfied. For example, the permission conditions for the fuel cut include: a condition that the cooling water temperature is equal to or greater than a predetermined temperature; a condition that the engine speed of internal combustion engine 1 is equal to or greater than a predetermined engine speed; and a condition that the vehicle speed is equal to or greater than a predetermined vehicle speed.

If determined to permit the fuel cut in step 2, step 3 is executed to select the combustion cylinder(s) and the non-combustion cylinders for operation immediately after implementing the fuel cut, depending on the torque of internal combustion engine 1 (which corresponds to the torque of internal combustion engine 1 immediately before the fuel cut), the engine speed of internal combustion engine 1, and the gear ratio of the transmission at that moment. Subsequently to step 3, step 4 is executed to control fuel injection for each cylinder in accordance with the selection in step 3. Accordingly, step 4 includes implementation of the fuel cut.

FIGS. 3A to 3D are time charts showing change in torque of the drive shaft (FIG. 3C) and torque of internal combustion engine 1 (FIG. 3D) upon the fuel cut, and are illustrative views drawn schematically for facilitation of understanding. The following exemplifies a case that the forcible regeneration of GPF 18 is in operation and a case that the forcible regeneration of GPF 18 is not in operation, wherein the latter case corresponds to normal operation. The forcible regeneration of GPF 18 is a factor that increases the torque of internal combustion engine 1 immediately before the fuel cut.

Each of broken lines (a) shows change in torque before and after the fuel cut, in case of the normal operation, i.e., in case that the forcible regeneration of GPF 18 is not in operation. At a time instant t1, the idle switch flag shown in FIG. 3A becomes ON, i.e., the accelerator opening degree becomes zero. At a time instant t2 slightly after time instant t1, the fuel cut is implemented (see a fuel cut permission flag in FIG. 3B). In the normal operation without the forcible regeneration of GPF 18, throttle valve 10 is substantially fully closed at time instant t1, and accordingly the torque of internal combustion engine 1 sufficiently decreases by time instant t2. The torque of the drive shaft becomes zero instantly at time instant t1 at which the accelerator opening degree becomes zero, and in many cases turns negative by time instant t2 at which the fuel cut is implemented. Thus, the backlash in the transmission and the drive system are absorbed before the fuel cut, and the transmission and the drive system are directly affected by a level difference in torque of internal combustion engine 1 which is generated due to the fuel cut.

Figures 3A, 3B, 3C, 3D:
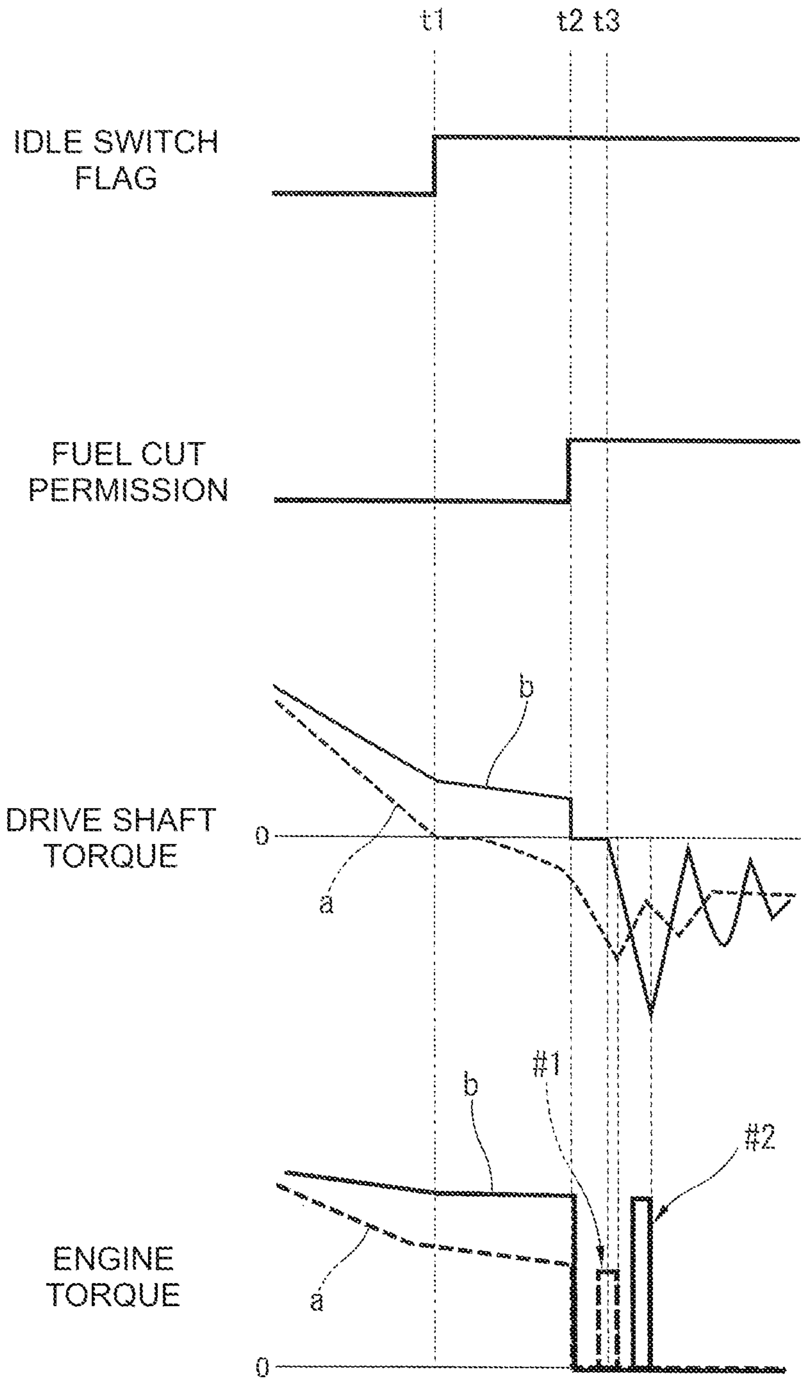
FIGS. 3A to 3D are time charts showing change in drive shaft torque and engine torque upon fuel cut, in light of contrast between when being in normal operation and when being in GPF-regenerating operation.

In view of the foregoing, the antiphase torque is desired to be generated at a timing that is delayed for the quarter cycle of the torsional vibration from time instant t2 as a starting point. The drawing shows an example of selecting a cylinder #1 as a combustion cylinder having an explosion stroke near to the timing desirable for generating the antiphase torque, in order to implement explosion and combustion in cylinder #1. This serves to suppress the frontward and rearward vibration of the vehicle (shown as fluctuation in torque of the drive shaft in FIG. 3C) due to the torsional vibration. In addition, reference sign #1 in FIG. 3D schematically indicates an injection pulse in cylinder #1. The explosion and combustion in cylinder #1 similarly raises the torque of internal combustion engine 1 in a pulsatile form, although not detailed in FIG. 3D.

In view of characteristics of broken line (a), the normal operation may be defined as a case that the torque of the drive shaft turns from positive to negative within a time period from the becoming zero of the accelerator opening degree until the implementation of the fuel cut.

Each of broken lines (b) shows behavior in case that the forcible regeneration of GPF 18 is in operation. As shown in FIG. 3D, the torque of internal combustion engine 1 is higher than the case of broken lines (a) during vehicle traveling, and is relatively high also after the accelerator opening degree becomes zero at time instant t1. This is because the forcible regeneration of GPF 18 requires an extra torque, i.e. extra amounts of intake air and fuel, in addition to a torque required for idle operation. Even after the accelerator opening degree is set to zero by a driver, the forcible regeneration of GPF 18 is continued, and throttle valve 10 is not fully closed but is maintained open at a certain degree. This raises the torque of internal combustion engine 1. In the present disclosure, such idle operation with the torque of internal combustion engine 1 higher than that for the normal operation is referred to as "high torque idle operation", for convenience. The same situation may occur in case that: loads due to the auxiliaries such as the compressor for the air conditioner and the alternator for generation are high; an inflow of purge gas from a canister is large; and/or the torque of internal combustion engine 1 is increased in compensation for a large loss due to friction etc. For example, in case that the loads due to the auxiliaries are large and simultaneously the forcible regeneration of GPF 18 is in operation, the torque of internal combustion engine 1 at the timing at which the accelerator opening degree is set to zero is further increased.

Accordingly, in case that the forcible regeneration of GPF 18 is in operation, the torque of internal combustion engine 1 stays relatively high even after the becoming zero of the accelerator opening degree at time instant t1, and is at a high level at time instant t2 at which the fuel cut is implemented. The implementation of the fuel cut drops the torque of internal combustion engine 1 to zero, in which the level difference in torque between before and after the fuel cut is greater than that in the normal operation shown by broken line (a).

On this occasion, the torque of the drive shaft decreases slowly because of a relatively high positive torque exerted on the transmission from internal combustion engine 1 even during a period between time instants t1 and t2. The torque of the drive shaft becomes zero in response to implementation of the fuel cut at time instant t2, and turns negative at a time instant t3. The time period between time instants t2 and t3 corresponds to a time lag due to the backlash in respective parts of the drive system. The frontward and rearward vibration of the vehicle due to the torsional vibration occurs from a starting point that is time instant t3 at which the torque of the drive shaft turns negative.

In this case, if the antiphase torque is generated at a timing delayed for the quarter cycle of the torsional vibration from time instant t2 as a starting point similarly to the case of the normal operation shown by broken line (a), the antiphase torque at such timing is premature and may not only fail to appropriately suppress the frontward and rearward vibration of the vehicle, but also rather deteriorate the vibration.

On the other hand, the fuel cut control according to the present embodiment is configured to set the timing of generating the antiphase torque to be later than that for the normal operation in view of the time lag from time instant t2 to t3, in case that the torque of internal combustion engine 1 immediately before the fuel cut is high. The drawing shows an example in which a cylinder #2 subsequent to cylinder #1 in the ignition order is selected as a combustion cylinder having an explosion stroke near to the timing desirable for generating the antiphase torque (i.e., a timing delayed for the quarter cycle of the torsional vibration from time instant t3 as a starting point). This means avoiding fuel injection in cylinder #1 determined as a non-combustion cylinder, and implementing fuel injection and ignition in the subsequent one, cylinder #2. This serves to suppress the frontward and rearward vibration of the vehicle (shown as fluctuation in torque of the drive shaft in FIG. 3C) due to the torsional vibration that starts from time instant t3. In addition, reference sign #2 in FIG. 3D schematically indicates an injection pulse in cylinder #2. The explosion and combustion in cylinder #2 similarly raises the torque of internal combustion engine 1 in a pulsatile form, although not detailed in FIG. 3D.

Each of pulse waveforms labelled with reference signs #1 and #2 has a height corresponding to an amount of fuel injection or a magnitude of torque generation in a cylinder. As shown in the drawing, in case of the high torque idle operation due to the regeneration of GPF 18, the amount of fuel injection in the combustion cylinder for generating the antiphase torque is increased in comparison with the normal operation. In other words, the antiphase torque is increased corresponding to a magnitude of the level deference in torque of internal combustion engine 1 caused by the fuel cut. The increase in antiphase torque serves to effectively suppress the torsional vibration, because the torsional vibration increases in amplitude with increase in torque level difference caused by the fuel cut.

As described above, the frequency of the torsional vibration is affected by the gear ratio of the transmission and by the engine speed of internal combustion engine 1. The lower the gear ratio of the transmission is (i.e., the lower speed gear the transmission is at), the lower the frequency of the torsional vibration is, and the more the timing late by the quarter cycle of the torsional vibration is delayed. The higher the engine speed of internal combustion engine 1 is, the higher the frequency of the torsional vibration is, and the more the timing late by the quarter cycle of the torsional vibration is advanced. In view of the foregoing, the combustion cylinder is optimally selected. For example, if desirable to generate the antiphase torque at a timing further later than cylinder #2, cylinders #1 and #2 are determined as the non-combustion cylinders, and the subsequent one, a cylinder #3, is selected as the combustion cylinder in which fuel injection and ignition are implemented.

In case that the antiphase torque is required to be further increased, i.e., in case that combustion with use of one cylinder is insufficient for generating a required antiphase torque, it is allowed to implement combustion and explosion in a plurality of cylinders.

The torque of internal combustion engine 1 immediately before the fuel cut can be appropriately calculated from the amount of intake air, the engine speed of internal combustion engine 1, the pressure inside the intake collector 7*a*, the opening degree of throttle valve 10, the amount of fuel injection, the ignition timing, a flow rate of EGR gas, a flow rate of purge gas, a torque loss inside the internal combustion engine 1, etc. The torque level difference due to the fuel cut may be calculated as a total sum of negative torques non-contributory to vehicle travel, such as drive torques of the auxiliaries including the compressor for air conditioner and the alternator, friction torques of the drive system including the transmission, amounts of air and fuel required for the regeneration of GPF 18.

The above embodiment exemplifies that the antiphase torque is generated basically at the timing determined depending on the magnitude of the torque of internal combustion engine 1 immediately before the fuel cut. However, the basic timing for generating the antiphase torque may be determined depending on presence or absence of a factor(s) predetermined as a representative factor(s), such as the forcible regeneration of GPF 18, that causes the torque of internal combustion engine 1 immediately before the fuel cut to be greater than the normal operation. This means setting the timing of the antiphase torque later than the normal operation, in response to the high torque idle operation such as the regeneration of GPF 18, without calculating an actual torque of internal combustion engine 1.

The invention claimed is:

1. A control method for an internal combustion engine configured to implement fuel cut responsive to an accelerator opening degree becoming zero during travel of a vehicle, and generate an antiphase torque after the fuel cut by supplying fuel to a cylinder so as to suppress vehicle body vibration of the vehicle caused by the fuel cut, the control method comprising:

setting a timing of generating the antiphase torque to be later than that for normal operation, in response to implementation of the fuel cut under high torque idle operation in which a torque of the internal combustion engine immediately before the fuel cut where the accelerator opening degree is zero is higher than that in the normal operation; and setting the timing of generating the antiphase torque based on a cycle of torsional vibration in a drive system of the vehicle caused by the fuel cut, the torsional vibration causing the vehicle body vibration, wherein the timing of generating the antiphase torque is delayed with decrease in gear ratio of a transmission upon implementing the fuel cut.

2. The control method as claimed in claim 1, the control method further comprising:

generating the antiphase torque at a magnitude that increases with increase in the torque of the internal combustion engine immediately before the fuel cut.

3. The control method as claimed in claim 1, the control method further comprising:

determining the internal combustion engine to be in the high torque idle operation, when regeneration of an exhaust particulate filter disposed in an exhaust system of the internal combustion engine is in operation.

4. The control method as claimed in claim 1, the control method further comprising:

determining the internal combustion engine to be in the high torque idle operation, when a torque of a drive shaft of the vehicle fails to turn from positive to negative within a time period from the accelerator opening degree becoming zero until the implementation of the fuel cut.

5. The control method as claimed in claim 1, wherein the cylinder to which fuel is supplied for generating the antiphase torque is selected from among cylinders sequentially ignited after the fuel cut in accordance with ignition order, based on a desired timing for generating the antiphase torque.

6. The control method as claimed in claim 1, wherein the timing of generating the antiphase torque is advanced with increase in engine speed of the internal combustion engine upon implementing the fuel cut.

7. A control device for an internal combustion engine, the control device comprising:

an accelerator opening sensor; and a fuel injector structured to inject fuel in each cylinder of the internal combustion engine, wherein the control device is configured to:

implement fuel cut responsive to an accelerator opening degree becoming zero during travel of a vehicle;

generate an antiphase torque after the fuel cut by supplying fuel to a cylinder so as to suppress vehicle body vibration of the vehicle caused by the fuel cut;

set a timing of generating the antiphase torque to be later than that for normal operation, in response to implementation of the fuel cut under high torque idle operation in which a torque of the internal combustion engine before the fuel cut where the accelerator opening degree is zero is higher than that in the normal operation; and set the timing for generating the antiphase torque based on a cycle of torsional vibration in a drive system of the vehicle caused by the fuel cut, the torsional vibration causing the vehicle body vibration, wherein the timing of generating the antiphase torque is delayed with decrease in gear ratio of a transmission upon implementing the fuel cut.

8. A control method for an internal combustion engine configured to implement fuel cut responsive to an accelerator opening degree becoming zero during travel of a vehicle, and generate an antiphase torque after the fuel cut by supplying fuel to a cylinder so as to suppress vehicle body vibration of the vehicle caused by the fuel cut, the control method comprising:

setting a timing of generating the antiphase torque to be later than that for normal operation, in response to implementation of the fuel cut under high torque idle operation in which a torque of the internal combustion engine immediately before the fuel cut where the accelerator opening degree is zero is higher than that in the normal operation; and setting the timing of generating the antiphase torque based on a cycle of torsional vibration in a drive system of the vehicle caused by the fuel cut, the torsional vibration causing the vehicle body vibration, wherein the timing of generating the antiphase torque is advanced with increase in engine speed of the internal combustion engine upon implementing the fuel cut.

* * * * *